United States Patent

Lewis

[11] Patent Number: 5,961,642
[45] Date of Patent: Oct. 5, 1999

[54] GENERIC KERNEL MODIFICATION FOR THE DYNAMIC CONFIGURATION OF OPERATING SYSTEMS IN A MULTI-PROCESSOR SYSTEM

[75] Inventor: Donald J. Lewis, Claremont, Calif.

[73] Assignee: NCR Corporation, Dayton, Ohio

[21] Appl. No.: 08/904,001

[22] Filed: Jul. 31, 1997

[51] Int. Cl.⁶ .................................................. G06F 13/00
[52] U.S. Cl. ............................... 713/1; 713/100; 709/221
[58] Field of Search .................................... 395/651, 652, 395/712, 200.52, 200.51; 713/1, 100, 2; 709/222, 221

[56] References Cited

U.S. PATENT DOCUMENTS

| | | | |
|---|---|---|---|
| 5,036,465 | 7/1991 | Ackerman, Jr. et al. | 235/400 |
| 5,142,680 | 8/1992 | Ottman et al. | 395/712 |
| 5,265,252 | 11/1993 | Rawson, III et al. | 395/681 |
| 5,761,669 | 6/1998 | Montague et al. | 707/103 |
| 5,774,720 | 6/1998 | Borgendale et al. | 395/682 |
| 5,799,187 | 8/1998 | McBrearty | 395/652 |
| 5,805,790 | 9/1998 | Nota et al. | 395/182.08 |
| 5,825,649 | 10/1998 | Yoshimura | 364/187 |

Primary Examiner—Zarni Maung
Attorney, Agent, or Firm—Gates & Cooper

[57] ABSTRACT

A method, apparatus, and article of manufacture for configuring an operating system on a multi-processor computer system. A generic kernel of the operating system is created for use on all of the processors of the multi-processor computer system. Tables within the generic kernel of the operating system are allocated that are large enough to be used with any of the processors of the multi-processor computer system. The generic kernel of the operating system is then copied to a plurality of data storage devices of the multi-processor computer system, wherein each of the data storage devices is associated with a different, specified one of the processors. Each of the copied generic kernels are modified to ensure that the allocated tables therein are correctly configured for the specified one of the processors of the multi-processor computer system.

27 Claims, 2 Drawing Sheets

GENERIC KERNEL MODIFICATION FOR THE DYNAMIC CONFIGURATION OF OPERATING SYSTEMS IN A MULTI-PROCESSOR SYSTEM

BACKGROUND OF THE INVENTION

1. Field of the Invention

This invention relates in general to operating systems for computers, and in particular, to the dynamic configuration of operating systems.

2. Description of Related Art

Computer systems are typically not operable until operating system software is installed. An operating system, such as Microsoft's Windows®NT, UNIX, or IBM's OS/2®, is usually installed to a root device, such as a hard drive, from which the operating system may be booted when the computer system is reset or powered-up.

Special installation software is typically used to prepare the root device for the installation of the operating system, including linking drivers and updating tables in an operating system kernel. Typical installation procedures can take from a few minutes to several hours before the computer system can be used by an operator.

Many users require a software installation mechanism that allows for parallel upgrades of software, wherein the system remains operating while the installation of the software on data storage device proceeds, and the system is interrupted only momentarily for the software to be loaded into the processor for execution. However, the mechanism must be easy to use, allow for flexibility, and allow all operations to be done while the system is operational, with only one restart required to come up to the new version. Further, many users need a mechanism to switch between versions of the software quickly, in order to minimize downtime. Finally, many users also want a way to quickly revert to a previous version of the software, if there are problems with the new version. There is consequently a need in the computer industry for a method for installing operating systems that addresses the above needs.

SUMMARY OF THE INVENTION

The present invention discloses a method, apparatus, and article of manufacture for configuring an operating system on a multi-processor computer system. A generic kernel of the operating system is created for use on all of the processors of the multi-processor computer system. Tables within the generic kernel of the operating system are allocated that are large enough to be used with any of the processors of the multi-processor computer system. The generic kernel of the operating system is then copied to a plurality of data storage devices of the multi-processor computer system, wherein each of the data storage devices is associated with a different, specified one of the processors. Each of the copied generic kernels are modified to ensure that the allocated tables therein are correctly configured for the specified one of the processors of the multi-processor computer system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Cross-Package-Add Tool

The present invention is a "Cross-Package-Add" (XPT) tool that can dynamically configure a generic kernel of an operating system for use on all processors of a multi-processor computer system, without requiring the creation of a specific kernel for each of the processors. The present invention also supports the installation of the generic operating system kernel one all processors of the system in parallel. In addition, the present invention allows the system to stay operational while the generic operating system kernel is being built and installed for use by all processors. Moreover, only a single restart of the system is required to quickly switch to new versions of the generic operating system kernel. Finally, as an added safety precaution, the present invention also supports keeping previous versions of the generic operating system kernel in a repository, in case a quick switch back to an older version of the generic operating system kernel is required.

Hardware Environment

Figure 1:
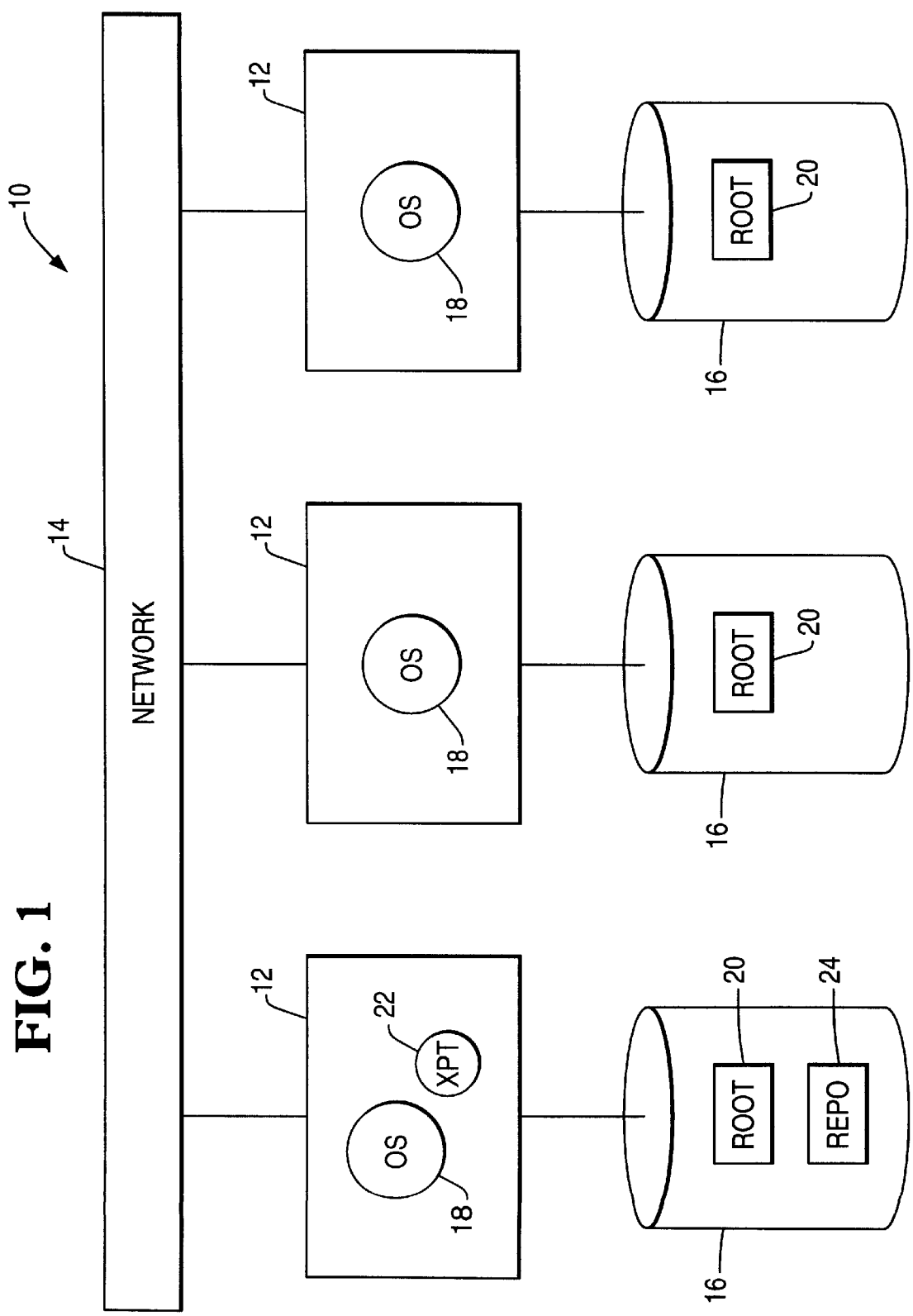
FIG. 1 illustrates an exemplary computer hardware environment that could be used with the present invention.

FIG. 1 is a block diagram illustrating an exemplary hardware environment that could be used with the present invention. In the exemplary computer hardware environment, a massively parallel processor (MPP) computer system 10 is illustrated. The computer system 10 is generally comprised of a plurality of processors 12 interconnected by a network 14. Each of the processors 12 may include, inter alia, one or more microprocessors, memory, and may be connected locally or remotely to fixed and/or removable data storage devices 16 and/or data communications devices. Those skilled in the art will recognize that any combination of the above components, or any number of different components, peripherals, and other devices, may be used with the MPP computer system 10.

Each of the processors 12 operate under the control of an operating system (OS) 18, such as UNIX, WINDOWS NT, etc. The operating system 18 is typically installed in "root" locations 20 of data storage devices 16 associated with the processors 12. When installed in this location 20, a kernel of the operating system 18 is booted into the memory of the processor 12 for execution when the processor 12 is powered on or reset. In turn, the operating system 18 then controls the execution of one or more computer programs 22 by the processors 12.

The present invention itself is a Cross-Package-Add Tool (XPT) 22 that comprises one or more computer programs 22, utilities, scripts, etc., each of which executes under the control of the operating system 18 and causes the MPP computer system 10 to perform the desired functions as described herein. These computer programs 22 work in conjunction with a repository 24 that acts as a persistent data store on a designated data storage device 16 according to the present invention.

The operating system 18 and computer programs 22 are each comprised of instructions which, when read and executed by the computer system 10, causes the computer system 10 to perform the steps necessary to implement and/or use the present invention. Generally, the operating system 18 and/or computer programs 22 are tangibly embodied in and/or readable from a device, carrier, or media, such as memory, data storage devices 16, and/or data communications devices. Under control of the operating system 18, the computer programs 22 may be loaded from the memory, data storage devices 16, and/or data communications devices into the memory of one or more of the processors 12 of the MPP computer system 10 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computerreadable device, carrier, or media of course, those skilled in the art will recognize many modifications may be made to this configuration without departing from the scope of the present invention.

Logic of the Cross-Package-Add Tool

Figure 2:
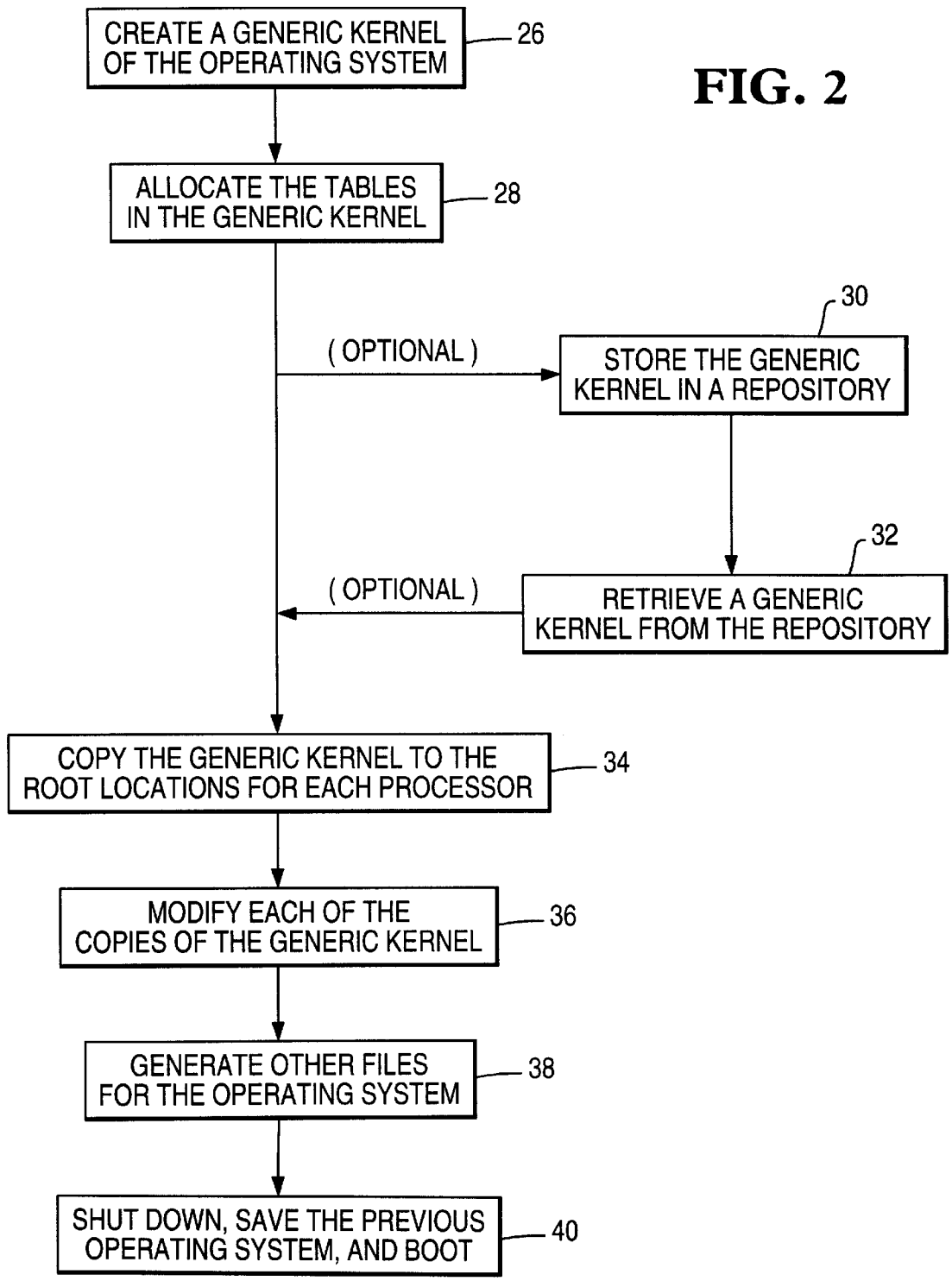
FIG. 2 is a flowchart that illustrates the logic of the Cross-Package-Add Tool according to the present invention.

FIG. 2 is a flowchart that illustrates the logic of the Cross-Package-Add Tool 22 according to the present invention.

Block 26 represents the Cross-Package-Add Tool 22 creating a generic kernel of the operating system 18 for use on all processors 12 of the MPP computer system 10. This step includes linking all device drivers used by all processors 12 in the MPP computer system 10 into the generic kernel.

Block 28 represents the Cross-Package-Add Tool 22 allocating tables within the generic kernel of the operating system 18 that are large enough to be used with any of the processors 12 of the MPP computer system 10. The values stored in these tables are used to identify the configuration of the processor 12 hardware and software to the operating system 18.

Block 30 represents the Cross-Package-Add Tool 22 (optionally) storing the generic kernel of the operating system 18 in the repository 24 stored on the data storage device 16 connected to one of the processors 12. It is assumed that any number of versions of the generic kernel may be pre-built and stored in the repository 24.

Thereafter, Block 32 represents the Cross-Package-Add Tool 22 (optionally) retrieving a version of the generic kernel of the operating system 18 from the repository 24 for a version switch. Typically, the repository 24 is organized by version number and the generic kernel is retrieved by version number.

Block 34 represents the Cross-Package-Add Tool 22 copying the generic kernel of the operating system 18 to a plurality of data storage devices 16, wherein each of the data storage devices 16 is associated with a different, specified one of the processors 12. This step includes placing these copies at appropriate locations (typically, the root locations 20) of the data storage devices 16 associated with the processors 12.

Block 36 represents the Cross-Package-Add Tool 22 modifying each of the copied generic kernels to ensure that the tables within each of the copies are correctly configured for the specified processor 12 (the configuration tables in the kernel are empty up until this point). In this step, values are stored into the tables to identify the hardware and software configuration of the processor 12 to the generic kernel of the operating system 18. In addition, this step allows the hardware and software configuration of the processor 12 to be dynamically changed.

Block 38 represents the Cross-Package-Add Tool 22 (optionally) generating any other files that may be necessary for execution of each particular copy of the modified generic kernel of the operating system 18 and storing those files at the respective root locations 20.

After the changes have been applied, Block 40 represents the Cross-Package-Add Tool 22 shutting down each of the processors 12 of the MPP computer system 10, (optionally) saving a copy of the previous operating system 18 to another location on the data storage devices 16 associated with the processors 12, and booting the modified generic kernel of the new operating system 18 from the root locations 20 of the data storage devices 16 into their respective processors 12 of the MPP computer system 10.

Advantages of the Cross-Package-Add Tool

The Cross-Package-Add Tool 22 of present invention is technically innovative because of a number of features. The present invention handles the installation at a system 10 level, rather than at a processor 12 level, in that it creates a generic kernel of the operating system 18 that can be used with multiple processors 12 of a MPP computer system 10. The Cross-Package-Add Tool 22 also allows parallel propagation of updates to the operating system 18, and supports version fallback by saving previous versions of the operating system 18 in separate locations of data storage devices. In addition, the Cross-Package-Add Tool 22 permits simultaneous system 10 operation during these updates and thus offers significant time savings. These features greatly improve reliability, availability, and serviceability of MPP computer systems 10.

Conclusion

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any computer system that executes multiple copies or images of an operating system could benefit from the present invention.

In summary, the present invention discloses a method, apparatus, and article of manufacture for configuring an operating system on a multi-processor computer system. A generic kernel of the operating system is created for use on all of the processors of the multi-processor computer system. Tables within the generic kernel of the operating system are allocated that are large enough to be used with any of the processors of the multi-processor computer system. The generic kernel of the operating system is then copied to a plurality of data storage devices of the multiprocessor computer system, wherein each of the data storage devices is associated with a different, specified one of the processors. Each of the copied generic kernels are modified to ensure that the allocated tables therein are correctly configured for the specified one of the processors of the multi-processor computer system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for configuring an operating system on a multi-processor computer system, comprising the steps of:

(a) creating a generic kernel of the operating system for use on all of the processors of the multi-processor computer system;

(b) allocating tables within the generic kernel of the operating system that are large enough to be used with any of the processors of the multi-processor computer system;

(c) copying the generic kernel of the operating system to a plurality of data storage devices of the multi-processor computer system, wherein each of the data storage devices is associated with a different, specified one of the processors; and (d) modifying each of the copied generic kernels to ensure that the allocated tables therein are correctly configured for the specified one of the processors of the multi-processor computer system, wherein values are stored into the allocated tables to identify a hardware and software configuration of the specified one of the processors to the generic kernel.

2. The method of claim 1, further comprising the step of booting each of the modified generic kernels into the specified one of the processors.

3. The method of claim 1, further comprising the step of saving a copy of a previous version of the operating system to another location on the computer system.

4. The method of claim 1, further comprising the step of storing the generic kernel and the operating system in a repository stored on the computer system.

5. The method of claim 4, further comprising the step of storing multiple versions of the generic kernel and the operating system in the repository.

6. The method of claim 5, wherein the multiple versions of the generic kernel and the operating system are organized in the repository by version number.

7. The method of claim 5, further comprising the step of retrieving a version of the generic kernel and the operating system from the repository to effect a version switch.

8. The method of claim 1, wherein the creating step further comprises the step of ling all device drivers used by all of the processors in the computer system into the generic kernel.

9. The method of claim 1, wherein the storing step further comprises the step of modifying the values into the tables to dynamically change the processor's hardware and software configuration.

10. An apparatus for configuring an operating system on a multi-processor computer system, comprising:

(a) a computer;

(b) means, performed by the computer, for creating a generic kernel of the operating system for use on all of the processors of the multi-processor computer system;

(c) means, performed by the computer, for allocating tables within the generic kernel of the operating system that are large enough to be used with any of the processors of the multi-processor computer system;

(d) means, performed by the computer, for copying the generic kernel of the operating system to a plurality of data storage devices of the multi-processor computer system, wherein each of the data storage devices is associated with a different, specified one of the processors; and (e) means, performed by the computer, for modifying each of the copied generic kernels to ensure that the allocated tables therein are correctly configured for the specified one of the processors of the multi-processor computer system, wherein values are stored into the allocated tables to identify a hardware and software configuration of the specified one of the processors to the generic kernel.

11. The apparatus of claim 10, further comprising means for booting each of the modified generic kernels into the specified one of the processors.

12. The apparatus of claim 10, further comprising means for saving a copy of a previous version of the operating system to another location on the computer system.

13. The apparatus of claim 10, further comprising means for storing the generic kernel and the operating system in a repository stored on the computer system.

14. The apparatus of claim 13, further comprising means for storing multiple versions of the generic kernel and the operating system in the repository.

15. The apparatus of claim 14, wherein the multiple versions of the generic kernel and the operating system are organized in the repository by version number.

16. The apparatus of claim 14, further comprising means for retrieving a version of the generic kernel and the operating system from the repository to effect a version switch.

17. The apparatus of claim 10, wherein the means for creating further comprises means for linking all device drivers used by all of the processors in the computer system into the generic kernel.

18. The apparatus of claim 10, wherein the means for storing further comprises means for modifying the values into the tables to dynamically change the processor's hardware and software configuration.

19. An article of manufacture comprising a computer program carrier readable by a computer and embodying one or more instructions executable by the computer to perform method steps for configuring an operating system on a multi-processor computer system, the method comprising the steps of:

(a) creating a generic kernel of the operating system for use on all of the processors of the multi-processor computer system;

(b) allocating tables within the generic kernel of the operating system that are large enough to be used with any of the processors of the multi-processor computer system;

(c) copying the generic kernel of the operating system to a plurality of data storage devices of the multi-processor computer system, wherein each of the data storage devices is associated with a different, specified one of the processors; and (d) modifyng each of the copied generic kernels to ensure that the allocated tables therein are correctly configured for the specified one of the processors of the multi-processor computer system, wherein values are stored into the allocated tables to identify a hardware and software configuration of the specified one of the processors to the generic kernel.

20. The method of claim 19, further comprising the step of booting each of the modified generic kernels into the specified one of the processors.

21. The method of claim 19, further comprising the step of saving a copy of a previous version of the operating system to another location on the computer system.

22. The method of claim 19, further comprising the step of storing the generic kernel and the operating system in a repository stored on the computer system.

23. The method of claim 22, further comprising the step of storing multiple versions of the generic kernel and the operating system in the repository.

24. The method of claim 23, wherein the multiple versions of the generic kernel and the operating system are organized in the repository by version number.

25. The method of claim 23, further comprising the step of retrieving a version of the generic kernel and the operating system from the repository to effect a version switch.

26. The method of claim 19, wherein the creating step further comprises the step of linking all device drivers used by all of the processors in the computer system into the generic kernel.

27. The method of claim 19, wherein the storing step further comprises the step of modifying the values into the tables to dynamically change the processor's hardware and software configuration.

* * * * *